United States Patent [19]

Burchard et al.

[11] 3,975,339

[45] Aug. 17, 1976

[54] MANUFACTURE OF POLYMERS OF NET-SHAPED STRUCTURE

[75] Inventors: Walther Burchard, Gundelfingen; Helmut Eschwey, Merzhausen, both of Germany

[73] Assignee: BASF Aktiengesellschaft, Ludwigshafen (Rhine), Germany

[22] Filed: Sept. 9, 1974

[21] Appl. No.: 504,379

[30] Foreign Application Priority Data
June 10, 1974 Germany............................ 2427957

[52] U.S. Cl................................. 526/347; 260/886; 526/75; 526/201
[51] Int. Cl.²................ C08F 210/00; C08F 212/00
[58] Field of Search............................... 260/88.2 C

[56] References Cited
UNITED STATES PATENTS
| | | | |
|---|---|---|---|
| 3,644,322 | 2/1972 | Farrar | 260/94.2 |
| 3,652,516 | 3/1972 | Farrar | 260/83.7 |
| 3,787,510 | 1/1974 | Farrar | 260/665 R |

FOREIGN PATENTS OR APPLICATIONS
| | | |
|---|---|---|
| 1,225,863 | 9/1966 | Germany |
| 1,225,864 | 9/1966 | Germany |
| 985,614 | 3/1965 | United Kingdom |

OTHER PUBLICATIONS
Worsfold et al., Canadian J. of Chemistry, 1969, 47, 3379–3385.

Swarc, Proceedings of Royal Society, Series A, 1964, 279, pp. 260–290.

Morton in "Vinyl Polymerization" Part II (Marcel Dekker)–1969, pp. 211–229.

Forman i "Polymer Chemistry of Synthetic Elastomers" Part II (Interscience) 1969, pp. 491–596.

*Primary Examiner*—Joseph L. Schofer
*Assistant Examiner*—A. L. Clingman
*Attorney, Agent, or Firm*—Johnston, Keil, Thompson & Shurtleff

[57] ABSTRACT

A process for the manufacture of polymers of net-shaped crosslinked structure and with uniform length of the crosslinks. In this process, polyfunctional organoalkali metal compounds which have been manufactured by reaction of divinylbenzene with low molecular weight organoalkali metal compounds, are reacted direct, or after prior reaction with anionically polymerizable monomers, with bifunctional or polyfunctional coupling agents. The polymers of net-shaped crosslinked structure have macroporous properties and can be employed, for example, as gels in gel permeation chromatography or as carriers in the synthesis of peptides.

3 Claims, 1 Drawing Figure

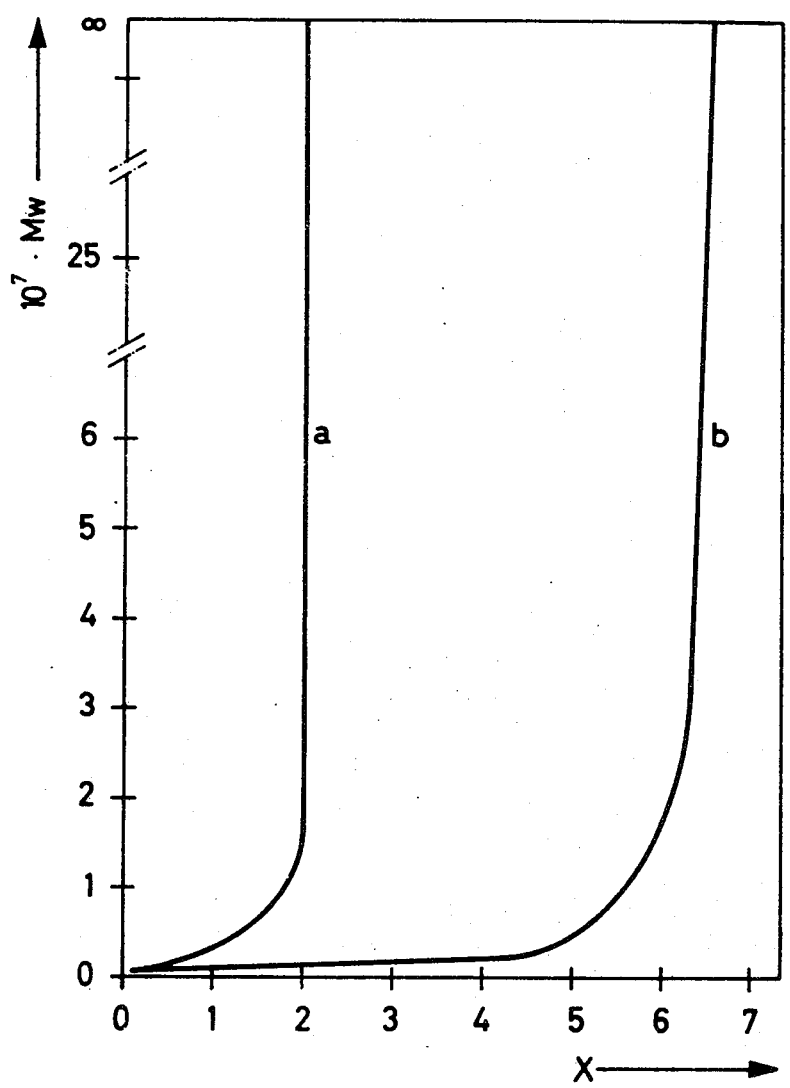

MANUFACTURE OF POLYMERS OF NET-SHAPED STRUCTURE

It is well-known to react polymers with terminal alkali metal atoms, so-called "living" polymers, with bifunctional or polyfunctional compounds, such as, for example, polyhalogenated hydrocarbons or dicarboxylic acid esters. In this reaction, the individual polymer molecules are coupled to one another by the polyfunctional compound. In addition to the increase in the size of the molecule, branched structures or crosslinked structures are produced in the polymers, depending on the nature of the "living" polymers used and of the coupling agents used. However, the polymeric networks thus obtained usually have an undefined and heterogeneous structure. Using the prior processes of this art, it is not possible to manufacture polymers crosslinked in a defined manner and having a particular structure.

We have now found that polymers of net-shaped crosslinked structure, having a defined number of crosslinks and uniform length of the crosslinks are obtained if divinylbenzene and low molecular weight organoalkali metal compounds are reacted with one another under special conditions and the polyfunctional organoalkali metal compounds thus obtained are reacted in a special manner with bifunctional or polyfunctional coupling agents.

Accordingly, the invention is concerned with a process for the manufacture of polymers of net-shaped crosslinked structure and with uniform length of the crosslinks, by reaction of organoalkali metal compounds with bifunctional or polyfunctional coupling agents, wherein (I) (a) divinylbenzene or mixtures of divinylbenzene with monovinyl-aromatic comounds and (b) low molecular weight organoalkali metal compounds with up to 50 carbon atoms in the organic radical are reacted with one another in inert organic solvents, the content of divinylbenzene in the reaction mixture not exceeding 2.5 per cent by weight, based on the reaction mixture, and the molar ratio of dinvinylbenzne to the alkali metal content of the low molecular weight organoalkali metal compound being from 0.5 : 1 to 20 : 1, and thereafter (II) the polyfunctional organoalkali metal compounds thus obtained are reacted, direct or after prior reaction with anionically polymerizable monomers, with bifunctional or polyfunctional coupling agents in a molar ratio of coupling agent to alkali metal content of the polyfunctional organoalkali metal compound of less than 1 : 1.

According to the invention, divinylbenzene and low molecular weight organometallic compounds are first reacted with one another. All three isomers of divinylbenzene, namely o-, m- and p-divinylbenzene, can be used for this purpose. The isomers can equally well be employed individually or as mixtures with one another. It is advantageous to use divinylbenzene as a mixture with monovinyl-aromatic compounds. Suitable monovinyl-aromatic compounds are particularly styrene and/or ethylvinylbenzene. However, monovinyl-aromatic compounds are to be understood as also including the side chain-substituted compounds, such as, for example, α-methylstyrene. The content of divinylbenzene in this mixture is as a rule from 10 to 80 per cent by weight and preferably from 30 to 60 per cent by weight, based on the mixture.

Low molecular weight organoalkali metal compounds are to be understood as compounds of which the organic radical can contain up to 50 carbon atoms. The low molecular weight organoalkali metal compounds can be monofunctional or polyfunctional. The organolithium compounds have proved particularly advantageous. All known low molecular weight compounds of this nature can be employed. Ethyl lithium, butyl lithium, phenyl lithium or tetrameric lithium α-methylstyrene may be mentioned as examples. Butyl lithium is preferred, and sec.-butyl lithium is particularly advantageous.

The organometallic compounds of sodium and of potassium are equally suitable. All compounds of sodium and potassium which are known, and have been described, as initiators of anionic polymerization can be used. Cumyl sodium, cumyl potassium, sodium naphthalene and tetrameric α-methylstyrene disodium, as well as tetrameric α-methylstyrene dipotassium may be mentioned as examples of these.

The reaction of divinylbenzene with the low molecular weight organoalkali metal compounds is carried out in high dilution in inert organic solvents as the reaction medium. Suitable solvents of this type are cycloaliphatic hydrocarbons, such as cyclohexane, cycloheptane and decahydronaphthalene; aromatic hydrocarbons, such as benzene, toluene, xylene or tetrahydronaphthalene, or mixtures thereof. It is also possible to use as solvents, the linear and cyclic ethers which are conventionally used for reactions of organometallic compounds, such as diethyl ether, phenyl methyl ether, dimethoxyethane, tetrahydrofuran or dioxan. The reaction temperature is as a rule from −100°C to +100°C and depends, in general, on the solvent chosen.

The reaction is preferably carried out in such a way that the polyfunctional reaction products which result are readily soluble in the inert organic solvents which serve as the reaction medium. Depending on the reaction conditions, the polyfunctional organoalkali metal compounds are branched to a greater or lesser degree or are in themselves crosslinked. Products which consist of such molecules, which are in themselves crosslinked but are still soluble, are described as micro-gels. However, partially or completely intermolecularly crosslinked, polyfunctional macro-gels can also result.

The factors which are of decisive importance for the course of the reaction of divinylbenzene with the low molecular weight organoalkali metal compounds are the concentration of the divinylbenzene in the reaction mixture and the ratio of divinylbenzene to low molecular weight organoalkali metal compound used in the reaction. The concentration of the pure divinylbenzene should be not more than 2.5 per cent by weight, based on the reaction mixture. Whilst higher concentrations of divinylbenzene are possible, such concentrations primarily give insoluble products crosslinked like a macro-gel, instead of the preferred soluble products.

The ratio of divinylbenzene to low molecular weight organoalkali metal compound used in the reaction decides the molecular weight, the degree of crosslinking — and therefore the solubility — and the number of alkali metal-carbon groups of the polyfunctional organoalkali metal compounds, for a given concentration of divinylbenzene in the reaction mixture. The chosen value of this ratio, or the limits within which it can be varied, depends primarily on the degree of dilution of the reaction mixture, that is to say on the concentration of the divinylbenzene.

A molar ratio of divinylbenzene to alkali metal content of the low molecular weight organoalkali metal compound of 0.5 : 1 usually represents the lower limit. A lower ratio is disadvantageous and serves no purpose, since under those conditions an unnecessary exess of low molecular weight organoalkali metal compound is employed.

The larger the chosen molar ratio of divinylbenzene to the alkali metal content of the low molecular weight organoalkali metal compound, the higher is the number of alkali metalcarbon bonds per molecule of the reaction product, the molecular weight of the latter and its degree of crosslinking. Above a certain limiting ratio, partial or complete intermolecular crosslinking occurs, with formation of insoluble macro-gels. The ratio of the two reactants at which complete crosslinking occurs depends on the concentration of the divinylbenzene in the reaction mixture. The limit is the higher, the lower the concentration of divinylbenzene.

This relationship is made clear in the accompanying drawing. The molar ratio X of divinylbenzene to the alkali metal content of the low molecular weight organoalkali metal compound (butyl lithium) is plotted on the abscissa and the average molecular weight $\bar{M}_w$ of the reaction products (determined as a weight average by the light scattering method) is plotted on the ordinate. Curve (a) shows the course of the reaction for a reaction mixture containing 2.5 per cent by weight of pure divinylbenzene, based on the reaction mixture, whilst curve (b) applies to a reaction mixture which contains 1.25 per cent by weight of divinylbenzene, based on the reaction mixture. At the value of X at which the curves run steeply upwards or, more precisely, at the value of X at which the molecular weight of the reaction product approaches infinity, complete crosslinking occurs, with formation of a macro-gel. It can be seen that the upper limit of the molar ratio of divinylbenzene to the alkali metal content of the low molecular weight organoalkali metal compound is 2 : 1 in the case of curve (a), (2.5% strength solution) and 6.7 : 1 in the case of curve (b) (1.25% strength solution).

The lower the chosen content of divinylbenzene in the reaction mixture, the higher are the values which this limiting ratio assumes. A molar ratio of divinylbenzene to alkali metal content of the low molecular weight organoalkali metal compound of 20 : 1 can be regarded as a reasonable upper limit. Admittedly, a molar ratio greater than 20 : 1 is still feasible; however, if at such a ratio soluble reaction products are desired, the reaction of divinylbenzene with the low molecular weight organoalkali metal compounds must be carried out at such extremely high dilution that the reaction becomes technically too involved and therefore of no interest.

The preferred molar ratios of divinylbenzene to alkali metal content of the low molecular weight organoalkali metal compound are from 0.5 : 1 to 10 : 1.

In other respects, the reaction of dinvinylbenzene and the low molecular weight organoalkali metal compounds is carried out under such conditions, for example in an inert gas atmosphere and with the exclusion of moisture, as are conventionally used, and generally known, for reactions of organometallic compounds with ethylenically unsaturated substances.

The reaction of divinylbenzene and the low molecular weight organoalkali metal compounds in the inert organic solvents leads to complete conversion of the reactants, that is to say polyfunctional organoalkali metal compounds which are composed of the same molar ratio of divinylbenzene to alkali metal as the reaction mixture are formed.

The soluble polyfunctional organoalkali metal compounds normally have a molecular weight of 500 to 10,000,000. These values are weight averages $\bar{M}_w$, determined by the light scattering method. However, it is also possible to obtain products which are still soluble even at a substantially higher molecular weight, for example an $\bar{M}_w$ of 250,000,000. Such products are, however, of less significance industrially. The intrinsic viscosity $[\eta]$ is less than 50 cm$^3$/g and preferably less than 20 cm$^3$/g.

If the reaction of divinylbenzene and the low molecular weight organoalkali metal compounds leads to a partially intermolecularly crosslinked product in which soluble constituents are present alongside an insoluble macro-gel, it is advantageous to separate the macro-gel from the supernatant solution and only to use the soluble parts of the reaction product for the next stage. However, it is also possible to use the entire reaction product, including the macro-gel constituent, for the further reaction.

The number of alkali metal-carbon bonds in the polyfunctional organoalkali metal compounds can be varied as desired through the choice of the reaction; conditions used in the manufacturing process. On average, the polyfunctional organoalkali metal compounds contain at least 2 alkali metalcarbon bonds per molecule. As has already been mentioned, a low content of alkali metal-carbon bonds results at a low molar ratio of divinylbenzene to alkali metal content of the low molecular weight organoalkali metal compound in the reaction mixture, for example a ratio of 0.5 : 1 or 1 : 1. If this ratio is increased, the number of alkali metal-carbon bonds can be increased as desired. Thus it is possible to manufacture polyfunctional organoalkali metal compounds with far in excess of 10,000 alkali metal-carbon bonds per molecule. The number of alkali metal-carbon bonds per molecule, $p$, can be calculated simply from the following relationship:

$$p = \frac{\bar{P}_n}{[DVB]/[Me^+]}$$

Herein, $\bar{P}_n$ is the degree of polymerization of the polyfunctional organoalkali metal compound, and $[DVB]/[Me^+]$ is the molar ratio of divinylbenzene to the alkali metal content of the low molecular weight organoalkali metal compound.

In a preferred embodiment of the invention, these polyfunctional organoalkali metal compounds are first reacted, prior to the reaction with the bifunctional or polyfunctional coupling agents, with anionically polymerizable monomers under the conventional and generally known conditions for anionic polymerization with organoalkali metal initiators. Examples of suitable monomers for this purpose are styrene, α-methylstyrene, vinyltoluene, butadiene, isoprene, dimethylbutadiene, methyl methacrylate, 2-vinylpyridine, 4-vinylpyridine, ethylene oxide and others. Styrene, the nuclear-substituted styrenes and the side chain-substituted styrenes are preferred. The monomers can be employed individually, as mixtures with one another or successively.

Polymers of star-shaped structure, having a polydivinylbenzene core and polymer side branches built up of the corresponding monomers, are obtained. Since each alkali metal-carbon bond of the polyfunctional organoalkali metal compound initiates the polymerization of a side branch, the number of star-shaped side branches corresponds to the number of alkali metal-carbon bonds in the polyfunctional organoalkali metal compounds. The degree of polymerization of the side branches, that is to say the length of a side branch, is determined by the ratio of the amount of monomer employed to the number of alkali metal-carbon bonds of the polyfunctional organoalkali metal compounds. It can therefore be selected, and varied, as desired. For the manufacture of the polymers of crosslinked structure, a degree of polymerization, per side branch in the star-polymers, of up to 1,000 is advantageous, and a degree of polymerization of from 30 to 1,000 is preferred. The star-shaped side branches have terminal alkali metalcarbon bonds.

According to the invention, the polyfunctional organoalkali metal compounds are reacted with bifunctional or polyfunctional coupling agents either direct or after the reaction with the anionically polymerizable monomers. Examples of coupling agents which can be used are divinyl compounds, polyhalogenated hydrocarbons and esters of dicarboxylic acids. Bifunctional coupling agents, such as divinylbenzene, diisopropenylbenzene, divinylanthracene, terephthalic acid dimethyl ester, methylene chloride and aliphatic $\alpha$-, $\omega$-substituted dihhalogenohydrocarbons, such as 1,2-dibromethane and the like, are preferred.

The reaction with the coupling agents is carried out in the same solvents as those which have served as the reaction medium for the manufacture of the polyfunctional alkali metal-organic compounds. The reaction temperature is as a rule from 0°C to 100°C and preferably from 20°C to 60°C. The coupling agent is added to the reaction mixture in such amounts that the molar ratio of coupling agent to alkali metal content of the polyfunctional organoalkali metal compound is less than 1 : 1. If bifunctional coupling agents are used, polymers of crosslinked structure are obtained, which contain different reactive groups, depending on whether a molar ratio of from 0.5 : 1 to 1 : 1, or a molar ratio of less than 0.5 : 1, is chosen. In the first case, the polymeric lattice still contains free functional groups of the coupling agent which could not react with an organoalkali metal group; in the latter case, the lattice still contains active alkali metal-carbon bonds which can be used for further reactions. The amount of coupling agent employed furthermore determines the number of crosslinking points. A molar ratio of less than 0.01 : 1 is generally not worth while, since the degree of crosslinking in the polymer then becomes too low.

Polymers of crosslinked structure with densely crosslinked cores of polydivinylbenzene, which are linked by crosslinks of uniform, defined length, are obtained. The length of the crosslink is defined as follows: it follows from the degree of polymerization of the side branches of the polymers of star-shaped structure, taking into account the bond length of a copolymerized monomer unit and the molecular length of the coupling agent, which can also be calculated from the known bond lengths. If the degree of polymerization of the side branches is O, that is to say if the polyfunctional organoalkali metal compounds are reacted direct with the coupling agents, the length of the crosslink correspondingly only amounts to the molecular length of the coupling agent. In that case it is advantageous to employ coupling agents which already have a sufficiently large molecular length, for example long-chain aliphatic $\alpha,\omega$-substituted dihalohydrocarbons, such as $\alpha,\omega$-dibromopolybutadiene having a degree of polymerization of from 30 to 200. Such products can be manufactured by, for example, polymerization of butadiene with bifunctional organoalkali metal initiators, followed by reaction with bromine. The length of crosslink of the polymers of crosslinked structure is advantageously from 200 to 100,000 A, preferably from 500 to 10,000 A.

The polymers of crosslinked structure manufactured as described above have macroporous properties and can therefore be employed for a range of different applications. For example, they can be employed as gels in gel permeation chromatography. They can also be used as carriers, for example in the synthesis of peptides by the Merrifield method.

The invention is illustrated by the examples which follow, but is in no way restricted thereto. The parts and percentages in the examples are by weight. The number-average molecular weight $\overline{M}_n$ is obtained by determining the osmotic pressure; the weight-average molecular weight $\overline{M}_w$ is determined by the light scattering method. The literature provides adequate descriptions of how to carry out these methods of analysis. The intrinsic viscosity $[\eta]$ is determined in solution in toluene at 25°C. For this determination, the compounds with active alkali metal carbon bonds must beforehand be deactivated by adding protonactive substances such as alcohols, water or acids.

EXAMPLE 1

1,100 ml of toluene (distilled over butyl lithium) and 20 ml of anhydrous tetrahydrofuran are introduced, whilst excluding atmospheric oxygen and moisture, into a two liter 4-neck flask, equipped with a stirrer, which has been cleaned by thorough heating and flushed with very pure nitrogen. 30 g of technical-grade divinylbenzene, which contains 50% of divinylbenzene and 50% of ethylvinylbenzene and which has beforehand been distilled in vacuo over calcium hydride, are added, and 77 ml of a 1.0 molar solution of n-butyl lithium in hexane are added to the mixture at 0°C. The reaction solution, which is an intense red color, is slowly brought to room temperature and stirred for 10 hours. When the solution has finished reacting, it is divided into two parts, A and B.

Part A of the solution (80% of the total amount) is intended for analytical purposes; it is precipitated in methanol and then dried in vacuo. This gives a polydivinylbenzene microgel with the following characteristics:

$\overline{M}_w = 700,000$; $= 11$ cm³/g.

The number of active lithium-carbon bonds per molecule is 270.

Part B of the solution (20% of the initial amount) is introduced, at 10°C, into a dry two liter 4-neck flask, flushed with nitrogen and containing 300 ml of dry styrene and 800 ml of dry toluene, whilst stirring. After careful warming to 30°C, the polymerization is started. Thereafter, the mixture must be cooled in order to remove the heat of reaction. After the polymerization has ended, the reaction solution is again divided into two parts, C and D.

Part C of the solution (10% of the total amount) is used for analytical purposes; it is precipitated in a fivefold amount of methanol and dried in vacuo. The polydivinylbenzenepolystyrene multi-star polymer shows the following characteristics: $\overline{M}_w = 5.5 \times 10^6$; = 7 cm$^3$/g; number of star branches per molecule = 270; $\overline{M}_w$ of a star branch about 17,500.

Part D of the solution (90% of the initial amount) is used to prepare a gel of defined length of crosslink. For this purpose, 9 g of technical-grade divinylbenzene, which contains 50% of divinylbenzene and 50% of ethylvinylbenzene and which has beforehand been distilled in vacuo over calcium hydride, are added to the solution with vigorous stirring. Gelling takes place instantly. The insoluble gel is precipitated in methanol and dried in a vacuum drying cabinet. The length of crosslink follows from the length of the star branches and is calculated to be approx. 1,050 A.

EXAMPLE 2

The procedure followed is as described in Example 1, but 1,2-dibromethane in a slight deficiency (2.5 g) is added to part D of the reaction solution. The reaction solution gels instantly and loses its color. The crosslinked product is worked up as described in Example 1. The length of crosslink in the resulting polymer of crosslinked structure is calculated to be 1,050 A.

We claim:

1. A process for the manufacture of polymers of net-shaped crosslinked structure and with uniform length of crosslinks, by reaction of low molecular weight organoalkali metal compounds with bifunctional or polyfunctional coupling agents, wherein I. a. mixtures of divinylbenzene with monovinylaromatic compounds and having a divinylbenzene content of from 10 to 80% by weight and
b. low molecular weight organoalkali metal compounds with up to 50 carbon atoms in the organic radical are reacted with one another in an inert organic solvent, the content of divinylbenzene in the reaction mixture not exceeding 2.5 percent by weight, based on the reaction mixture, and the molar ratio of divinylbenzene to the alkali metal content of the low molecular weight organoalkali metal compound being from 0.5 : 1 to 20 : 1, and thereafter II. the polymeric polyfunctional organoalkali metal compounds thus obtained are reacted, with bifunctional or polyfunctional coupling agents such as divinylbenzene, diisopropenylbenzene, divinylanthracene, terephthalic acid dimethyl ester, methylene chloride and 1,2-dibromoethane in a molar ratio of coupling agent to alkali metal content of the polymeric polyfunctional organoalkali metal compound of less than 1:1.

2. A process as set forth in claim 1 wherein said polymeric polyfunctional organoalkali metal compound has an intrinsic viscosity [$\eta$] of less than 50 cm$^3$/g and wherein said coupling agent is selected from the group consisting of divinylbenzene, diisopropenylbenzene, divinylanthracene, terephthalic acid dimethyl ester, methylene chloride and 1,2-dibromoethane.

3. A process as set forth in claim 1 wherein said polymeric polyfunctional organoalkali metal compounds obtained are, after prior reaction with anionically polymerizable monomers, reacted with said bifunctional or polyfunctional coupling agents in a molar ratio of coupling agent to alkali metal content of the polyfunctional organoalkali metal compound of less than 1:1.

* * * * *